June 23, 1970    R. P. REBRES    3,517,183
MICROSCOPE ILLUMINATOR

Filed April 1, 1968    3 Sheets-Sheet 1

ROBERT P. REBRES
INVENTOR.

BY Frank C. Parker

ATTORNEY

June 23, 1970     R. P. REBRES     3,517,183
MICROSCOPE ILLUMINATOR

Filed April 1, 1968     3 Sheets-Sheet 2

ROBERT P. REBRES
INVENTOR.

BY Frank C. Parker

ATTORNEY

June 23, 1970    R. P. REBRES    3,517,183
MICROSCOPE ILLUMINATOR

Filed April 1, 1968    3 Sheets-Sheet 3

ROBERT P. REBRES
INVENTOR.

BY Frank C. Parker

ATTORNEY

United States Patent Office 3,517,183
Patented June 23, 1970

3,517,183
MICROSCOPE ILLUMINATOR
Robert P. Rebres, Fairport, N.Y., assignor to Bausch & Lomb Incorporated, Rochester, N.Y., a corporation of New York
Filed Apr. 1, 1968, Ser. No. 717,752
Int. Cl. F21v *33/00*
U.S. Cl. 240—2
7 Claims

ABSTRACT OF THE DISCLOSURE

A microscope illuminator has various devices such as fins, heat conducting and radiating panels and ventilation for reducing the operating temperature of the illuminator. A single rotatable member holds a plurality of colored filters readily movable between a light source and the light conducting elements to the microscope. The illuminator is constructed of bayonet and screw type fasteners so as to be readily fabricated and easily serviceable.

BACKGROUND OF THE INVENTION

This invention relates to an improved microscope illuminator such as is usable for providing light to the optical system of a stereomicroscope. It could also be used as a source of illumination for microscopes used for examining samples wherein the light is transmitted down through the optical system and reflected from the sample being viewed, back toward the eyepiece of the microscope. This latter case is the well-known table metallurgical microscope.

There are many microscope illuminators available for use with both the stereo and non-stereomicroscopes. The presently known microscope illuminators generally require a series of individual filter holders in order to provide different types of colored light to the optical system. Well known illuminators are also characterized in that after prolonged use there is a significant temperature rise due to the light source involved. In well known illuminators the temperature at the lamp flange can rise to about 300 to 350° F. At this temperature there is a possibility that the solder attaching the lamp flange to the lamp base will soften allowing relative movement between these two pieces and causing the lamp to be rendered useless. At these high temperatures it also makes it very inconvenient when a lamp has to be replaced to remove the lamp from the lamp holder and replace it with a new lamp. A significant amount of heat in a microscope illumination system can cause distortion of the microscope image if this heat is transmitted to the optical system.

SUMMARY OF THE INVENTION

In order to avoid the above mentioned problems and, to more generally provide an improved microscope illuminator, I have devised an illuminator that rapidly dissipates the heat from the light source and further provides a unitary carrying member for carrying a plurality of colored filters. Accordingly, it is the primary object of this invention to provide a microscope illuminator that will operate at a reduced temperature.

It is a further object of this invention to provide a microscope illuminator wherein a plurality of colored filters are disposed between the light source and the light conductive means to the microscope in a single carrying device.

It is a further object of this invention to provide a microscope illuminator that can be readily serviced.

DESCRIPTION OF THE PREFERRED EMBODIMENTS

Figure 1:
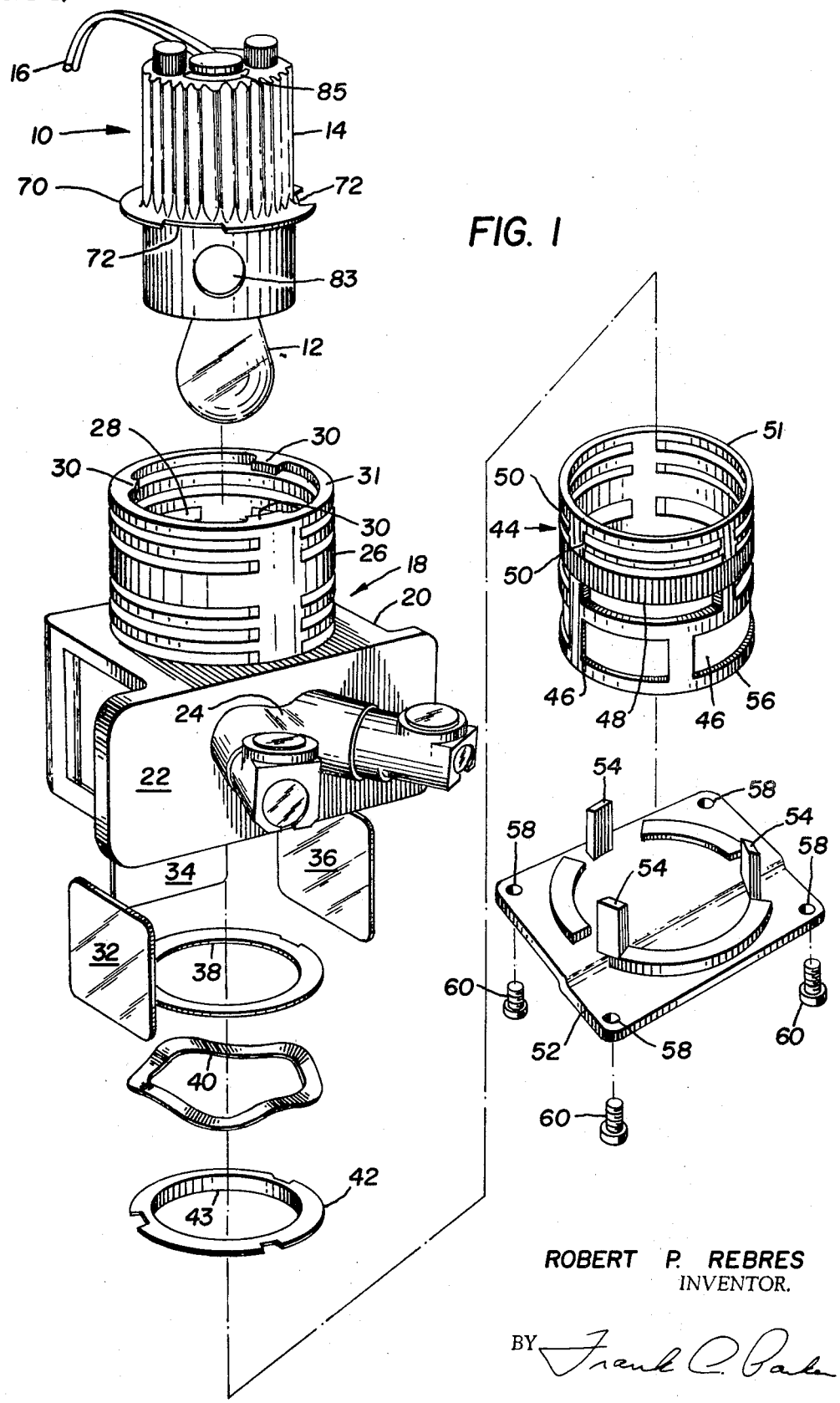
FIG. 1 is a perspective exploded view of one embodiment of the present invention.

Referring to the drawings and in particular to FIG. 1, number 10 shows a lamp assembly such as is well known in the art. The lamp assembly 10 comprises a lamp 12 and a lamp receiving member 14 which is connected to a suitable source of electricity (not shown) by electrical connecting means 16.

The illuminator housing shown generally as 18 has a bottom rectangular portion 20 comprising a face plate 22 wherein is mounted light conducting means to the microscope body. The conducting means 24 is comprised of a suitable beam splitter and system for conducting the light to the microscope body and is shown for information only and forms no part of this invention. The illuminator housing 18 is generally rectangular in shape in the bottom portion 20 and contains in the top portion generally cylindrical lamp receiving member 26 which is provided with an aperture 28 in the rear portion, the function of which will be explained subsequently. The cylindrical portion 26 of the illuminator housing contains retaining protrusions 30 at top surface 31 for retaining the lamp assembly in position in illuminator housing 18. Side panels 32—34—36 are removably mounted in the bottom portion 20 of lamp housing 18. The movable side panels are manufactured from a material that will transmit infrared radiation, but will not transmit visible radiation. There is further provided in the illuminator housing a flat washer 38, a wavy washer 40 and another flat washer 42.

The filter holder designated as 44 contains a plurality of rectangularly shaped apertures 46 in the bottom section thereof for receiving colored filters. The rectangular apertures 46, of the filter holder 44 may be aligned with the optics 24 in a radial sense by the action of a spring loaded steel ball with housing 20 and filter holder 44. The filter holder is generally cylindrical in shape and has a knurled surface around the circumference 48. The knurled surface is positioned adjacent aperture 28 of portion 26 when the filter holder is inserted into the lamp housing 18. This makes it possible for the persons using the microscope to which the illuminator housing is attached to change the filter at will by rotating holder 44 through aperture 28. The filter holder 44 is of such diameter to fit within the top portion of the illuminator housing 26. The filter holder 44 is further characterized in that it is provided with a series of slots 50 around the circumference in the upper portion for heat ventilation purposes, as will hereinafter be more fully described.

The final piece of the illuminator housing is the bottom cover 52 fabricated from the same material as side panels 32—34—36. The bottom panel 52 is provided with a plurality of vertical posts 54 adapted to receive the bottom surface 56 of filter holder 44. The bottom cover is also provided with a series of apertures 58 to receive the fastener such as screws 60 for fastening the bottom cover 52 to the illuminator housing 18.

Figure 2:
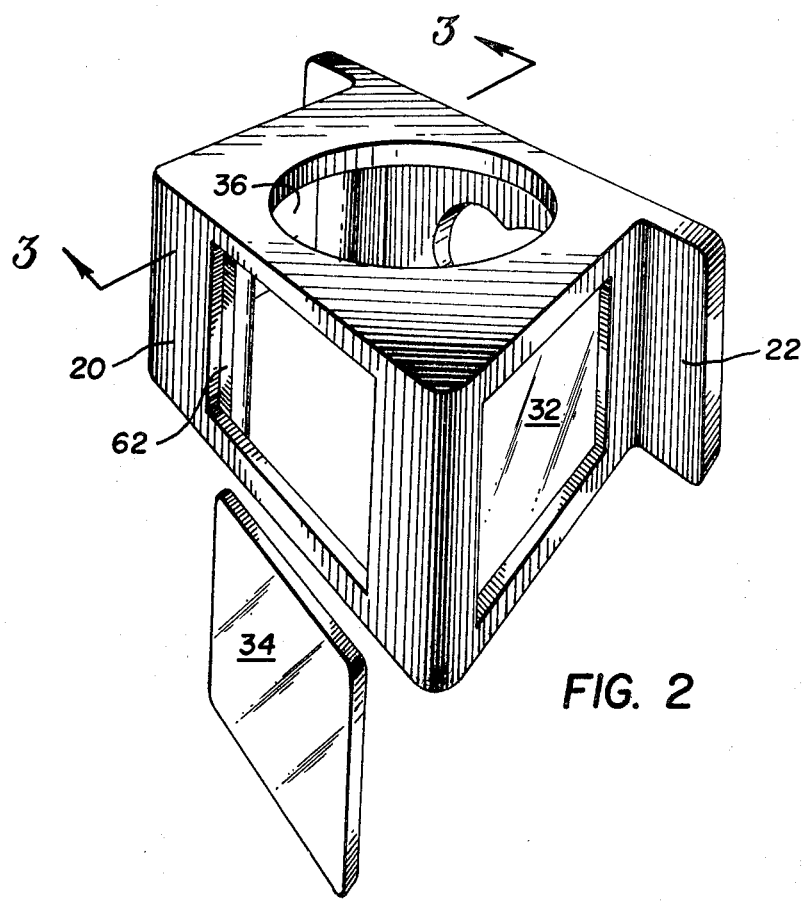
FIG. 2 is a perspective view of the bottom half of the illuminator housing.
Figure 3:
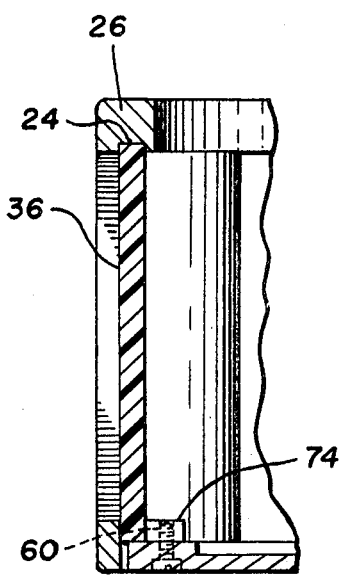
FIG. 3 is a partial section taken along line 3—3 of FIG. 2.

Referring now to FIGS. 2 and 3, the removable side panels 32—34—36 are shown in more detail. FIG. 2 shows a recess 62 in the bottom portion of the lamp housing 20 for receiving the side panel 34. This can be seen in FIG. 3 where the side panel 36 is in place and is held there by the bottom cover 52 which is held by screws 60.

Referring back to FIG. 1 the upper portion of the illuminator housing 26 is provided with a top surface 31 that projects inwardly of the circular portion. The illuminator housing 10 is provided with a flange 70 of larger diameter than the inner diameter of the surface of 31 and of smaller diameter than the inside diameter of upper portion of lamp housing 18. The flange 70 is provided with slots 72 of sufficient size allowing them to slip over protrusions 30 of upper portion 26 of illuminator housing 18.

In the operation the illuminator is assembled by placing the side panels 32–34–36 in place and inserting the flat washer 38 and the wavy washer 40 and the washer 42 in the upper portion of the lamp housing 18 so that they abut the bottom of surface 31. Next the filter holder 44 is inserted into the illuminator housing 26 so that its top surface 51 is in contact with the bottom of surface 31 of portion 26. The bottom cover 52 is then fastened to the bottom of the microscope housing by means of screws 60 into screw receiving means 74 as shown in FIG. 3. Thereafter the lamp assembly 10 can be placed into the illuminator by aligning the slots of the protrusions 30 depressing the lamp housing 10 and turning either clockwise or counterclockwise until the slots 72 are no longer aligned with protrusions 30. This aligns lamp housing 10 firmly in place. The distance from the bottom of surface 31 is such that when the lamp housing 10 and filter holder 44 are in place, the source of illumination 12 (filament) and the apertures 46 and light conducting means 24 are in axial alignment. Adjusting screws are provided at the top of housing 10 to assure precise alignment of lamp 12 with optical system 24.

I have found that the following materials are suitable for side panels 32–34–36 and bottom cover 52; Polysulfone, polycarbonate, copoly(tetrafluoroethylene-hexafluoropropylene), poly(tetrafluoroethylene), poly(chlorotrifluoroethylene), polyamide, polypropylene, poly(4-methylpentene), and polyacetal. These materials will transmit infrared radiation and will also transmit a certain amount of visible radiation therefore they will have to be compounded with a suitable black dye. It is well known that polyamide and polyacetal are translucent to opaque in the virgin state. Their opacity varies and if they are selected as relatively thick members, they may not have to be dyed at all.

Figure 4:
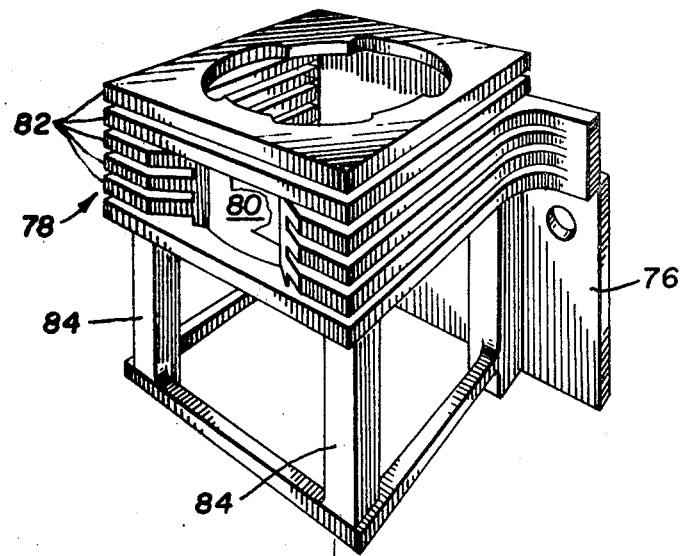
FIG. 4 is a partial perspective view showing alternate embodiments for the illuminator housing of the present invention.
Figure 4:
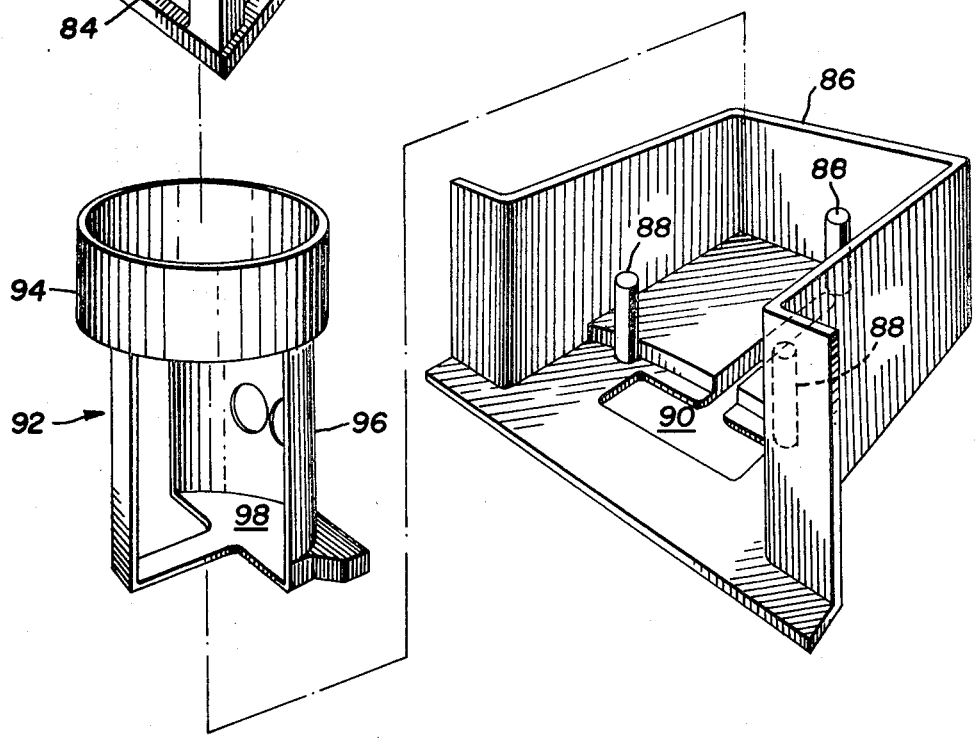

An alternate embodiment, and one that may prove to be the best is shown partially in FIG. 4. As shown in FIG. 4 the lower portion of the illuminator housing is provided with a separate face plate 76. This face plate 76 is selected from a material that will readily conduct heat, such as aluminum. Mounted on the face plate 76 is a light conducting member such as 24 shown in FIG. 1. The balance of the lower portion of the illuminator housing shown generally as 78 in FIG. 4 is similar to the bottom of illuminator housing 18 as shown in FIG. 1. There is provided in illuminator housing 78 an aperture 80 that communicates with knurled surface 44 of the filter holder for allowing rotation thereof about its vertical central axis. A series of slotted openings 82 are provided for allowing heat radiation away from the lamp housing. Posts 84 are provided for supporting the bottom cover shown generally as 86. The bottom cover 86 is provided with posts 88 to receive the bottom surface 56 of the filter holder 44. T-shaped aperture 90 is provided to admit air for removal of heat by convection, and allow alignment of optics 24. A further heat conducting member 92 is provided for conducting heat from the lamp to the face plate 76 and away from the source of illumination. The conducting member 92 contains an upper ring 94 and vertical supports 96 and a shoe or bottom member generally T-shaped 98. The diameter of the member 92 is smaller than the inside diameter of filter holder 44 to permit the filter holder 44 to rotate around member 92. The portion 94 fits above the apertures 46 of filter holder 44 and therefore does not interfere with the radiation conducting path.

This embodiment of the invention is assembled as before with the member 92 attached to the face plate 76 and disposed within the central portion of the bottom of the illuminator housing 78, after the necessary washers and filter holder are inserted. The cover is then placed over the bottom portion and fastened thereto by means of screws similar to those shown as 60 in FIG. 1.

In this embodiment the cover member 86 is fabricated of the same material as used for panels 32–34–36 and cover 52 in the embodiment of FIG. 1.

The heat conducting member 92 is made of conducting material similar to that of face plate 76 and is preferably of aluminum.

In the embodiment of FIG. 4 heat is dissipated from the microscope by three well known techniques and these are: radiation through the heat conducting synthetic material of the cover 86 and from the lamp housing 10, convection through the bottom cover and up through the housing and the aperture 83, 85 (lamp housing 10 and member 92 act in combination as a chimney), and conduction through the members 92–76 and into the mounting on a stereomicroscope (not shown) which acts as a heat sink.

In the embodiment of FIG. 1, the well known chimney effect for ventilating the microscope illuminator is used and also radiation through the synthetic side panel 32–34–36 and bottom member 52.

I have made some direct comparisons between operating temperature of an illuminator according to my invention and a well known illuminator such as in common use with bench type microscopes. These comparisons lead to finding a temperature of 325° F. at the lamp flange in the well known illuminator and a temperature of 184° F. at the lamp flange in my illuminator. I also found that in the well known illuminator the lamp holding mount temperature was 192° F. while the lamp holder mount temperature of my illuminator was 144° F. This results in a 43% decrease in temperature at the lamp flange and a 25% decrease in temperature at the lamp holder mount.

It is also apparent that since synthetic materials are used for the illuminator housing, such an illuminator housing can be readily fabricated. It is also apparent that since the lamp housing has only a few pieces it can be readily assembled and easily serviced.

While the invention has been disclosed by reference to two preferred embodiments, it should be understood that it may be modified or embodied in other forms without departing from the spirit and scope of the appended claims.

I claim:
1. A microscope illuminator comprising a source of illumination, a lamp housing and means to conduct the light to the optical system of the microscope wherein:
said lamp housing comprises a generally rectangular bottom member with removable side one end and bottom panels, light conducting means disposed in the other end panel, with a circular aperture in the top of said bottom member and a generally cylindrical top member fixed to said bottom member;
a generally cylindrical sleeve member with a plurality of generally rectangular apertures therein rotatably disposed within said top member and projecting downwardly into said bottom member;
a generally cylindrical illuminating source disposed within said top member and projecting downwardly into said bottom member;
whereby said illumination source, said rectangular apertures in said sleeve member and said light conducting means are aligned on the same axis.

2. An illuminator according to claim 1 wherein the removable side and bottom panels of the bottom member are selected from the group consisting of polysulfone, polycarbonate, copoly(tetrafluorethylene - hexafluoropropylene), poly(tetrafluorethylene), poly(chlorotrifluoroethylene), polyamide, polypropylene, poly(4-methylpentene) and polyacetal compounded with a suitable dye to make said panels opaque to radiation in the visible portion of the spectrum.

3. An illuminator according to claim 1 wherein the rectangular apertures in the cylindrical sleeve member contain colored filters.

4. An illuminator according to claim 1 wherein the removable side and bottom panels of the bottom member are polysulfone.

5. A microscope illuminator comprising a source of illumination, a lamp housing, and means to conduct the light to the optical system of the microscope, wherein:
said lamp housing comprises a heat conducting face plate containing means for conducting the light to the optical system of the microscope, a generally rectangular bottom member with a generally circular aperture in its top mounted on said face plate, a heat conducting member attached to said face plate and disposed within said bottom member, a generally cylindrical top member fixed to said bottom member and communicating with the aperture in said bottom member, a cover mounted on said bottom member;

a generally cylindrical sleeve member with a plurality of generally rectangular apertures therein, rotatably disposed within said top member projecting downwardly into said bottom member and surrounding said cylindrical heat conducting member;

a generally cylindrical illumination source disposed within said top member and projecting downwardly into said bottom member; whereby, said illumination source, said rectangular apertures in said sleeve member and said light conducting means are aligned on the same axis.

6. An illuminator according to claim 5 wherein the lamp housing and bottom cover are polysulfone.

7. An illuminator according to claim 5 wherein the face plate and heat conducting member are made of aluminum.

References Cited

UNITED STATES PATENTS

| 2,587,956 | 3/1952 | Bastien | 240—2 |
| 2,691,918 | 10/1954 | Robins | 240—2 XR |
| 3,278,739 | 10/1966 | Royka | 240—2 |

NORTON ANSHER, Primary Examiner

D. S. STALLARD, Assistant Examiner

U.S. Cl. X.R.

350—87, 91